Patented May 18, 1937

2,080,582

UNITED STATES PATENT OFFICE 2,080,582

REMOVAL OF ARSENICAL IMPURITIES

Victor E. Speas and Nathan M. Mnookin, Kansas City, Mo., assignors to Speas Mfg. Co., Kansas City, Mo., a corporation of Missouri No Drawing. Application July 16, 1934, Serial No. 735,431

15 Claims. (Cl. 99—147)

The present invention relates to the removal of minute portions or traces of arsenical compounds or impurities in solutions such as beer, extracts, medicinal preparations, fruit juices, wines, vinegars, lotions, etc.

To safeguard the public health the Government has established an arbitrary tolerance limiting the permissible amount of these arsenical compounds to 0.01 grain per pound. In accordance with our invention, the minute quantities of arsenical compounds or impurities present in the solutions are substantially entirely removed or reduced to below the tolerance allowed by the Government without changing, damaging or modifying the nature or properties of the products treated.

The present invention comprehends the treatment of a solution containing a trace or minute quantity of an arsenic compound with an adsorptive agent which forms an insoluble gelatinous precipitate such as the insoluble metal hydroxides. The solution to be treated may be acid in character or is made acid, to hasten and improve the adsorption of the arsenic or arsenical compound, and the adsorption preferably takes place in the presence of an agent which inhibits or prevents the dissolution of the adsorptive agent by the acid. After treatment the adsorptive agent such as the metal hydroxide and the adsorbed arsenical component may be removed in any desirable manner; for example, by filtering the insoluble gelatinous material from the solution.

In the known prior art when insoluble metallic hydroxides have been used to adsorb arsenic or arsenical compounds from solution, the adsorption of these compounds has been confined or limited solely to solutions which were neutral or alkaline or rendered so. There are many solutions which are naturally acidic and which cannot be neutralized or alkalinized without an impairment, modification, or destruction of their natural qualities or peculiarities and characteristic traits or properties. Normally an attempt to adsorb the arsenical impurities of an acidic solution would result in the dissolution of the adsorbent, such as the insoluble hydrated metal oxide, by reaction with the acid whereby the adsorbent would be destroyed, or chemically modified. The reaction taking place is of the character of the general reaction between an acid and a base. Therefore, in carrying out the process of the known prior art the adsorbent agent utilized must be employed in such an amount as not only to neutralize the acid component and hence the solution, but also to effect the desired adsorption when the solution becomes neutral. Such reactions not only consume appreciable quantities of the insoluble hydrated metal oxide but also change the acidic content of the product itself, and color and otherwise adversely affect and modify the character of the solution so treated. Such reactions furthermore preclude the use of these adsorptive agents in many commercial applications where only a small amount of insoluble hydrated metal oxide would be permissible.

In contradistinction, we have now found that an enhanced adsorption of arsenic, or arsenical compound may be effected in an acidic solution with a substantially lesser amount of the insoluble hydrated metal oxide without any chemical reaction such as dissolution taking place between the adsorbent and the acid components of the solution. To accomplish this we may suitably employ an agent which has the property or faculty of preventing or inhibiting any chemical reaction such as dissolution taking place between the adsorptive agent and the acid, thus leaving the adsorbent free to adsorb the arsenic or arsenic impurity. Only a very small quantity of the inhibitor is necessary to make all of the adsorptive insoluble gelatinous oxide used available for the adsorption of the arsenic or arsenic compound present. This results in requiring a much smaller amount of adsorbent with the resultant advantage of economic gain or saving and in the preservation of the natural qualities and characteristics of the solution.

To illustrate, the following examples are given, wherein three equal portions numbered 1, 2 and 3 are taken from a solution containing 0.02 grain of arsenic per pound of the solution, and 4% of acetic acid.

No. 1 represents an aliquot part of the original sample for control.

No. 2 represents an aliquot portion treated with 0.25% iron hydroxide, agitated, and filtered.

No. 3 represents another aliquot portion to which 0.20% of tannic acid has been added, and which was then treated with 0.25% iron hydroxide, agitated, and filtered.

They are tabulated as follows:

|  | Before treatment | Treatment | | After treatment |
|---|---|---|---|---|
|  | $As_2O_3$ | $Fe(OH)_3$ | Tannic acid | $As_2O_3$ |
|  | Grain per lb. | Percent by wt. | Percent by wt. | Grain per lb. |
| (1) 4% acetic acid | 0.020 | 0 | 0 | 0.020 |
| (2) 4% acetic acid | 0.020 | 0.25 | 0 | 0.016 |
| (3) 4% acetic acid | 0.020 | 0.25 | 0.2 | 0.003 |

The filtrate from No. 2 showed a dark reddish coloration indicating that the acetic acid had reacted with a large portion of the iron hydroxide, forming iron acetate, and thus destroying its effectiveness for arsenic removal. This confirms the statement made above concerning the chemical reaction between the adsorbent and the acid when no inhibitor is used.

No. 3, which contained the inhibiting agent, 0.2% of tannic acid, produced a clear colorless filtrate, showing that none of the iron hydroxide had been dissolved or affected by the acetic acid, thus leaving the entire amount of the iron hydroxide available to form the adsorptive hydrogel.

We have further found that a more immediate and economical removal of the arsenic, or arsenical impurities, is effected when the adsorption takes place in an acid or acidified solution in the presence of an agent which inhibits or prevents dissolution of the adsorbent agent by the acid. Moreover, we have further found that the acid so accelerates, or activates or otherwise affects the adsorptive power of the insoluble metal hydrated oxide as to permit the use of a minimum quantity of the hydrated oxide for adsorbing the maximum quantity of arsenic. Only in the case where the solution is acidic have the arsenical compounds been removed by quantities of the insoluble metal hydrated oxide that approach the minimum quantities shown by the empirical adsorptive laws. Substantially larger quantities of the insoluble metal hydrated oxides are required to accomplish the equivalent reductions when the solution is alkaline than when it is acid. When a 4% acetic acid solution, as shown in the above table, is treated with 0.25% iron hydroxide and 0.2% tannic acid by weight, the arsenic is reduced from 0.020 to 0.003, while an alkaline solution containing 0.02 grain $As_2O_3$ per pound and 4% NaOH similarly treated, is reduced only to 0.15 grain.

In numerous trials we have determined that in different products the preferred ratios of the insoluble metal hydrated oxides, inhibiting agents, and acid may vary over a considerable range, but the most desirable proportions are determinable by a few simple trials for any particular product. In many articles of commerce in solution form containing a trace or minute amount of arsenic, or arsenical compounds, whose acidities vary from 1% to 10% we found it desirable to add usually from 0.05 to 0.5 of 1% of tannic acid, and then to treat with from ⅛% to 1% of ferric hydroxide; some products, such as wines from certain districts, fruit juices, or vinegars, may contain sufficient, or nearly sufficient inhibiting agent of the character of tannic acid, or tannates, which in their naturally-occurring form may be designated tannin-like bodies, and require little or no addition of an inhibitor thereto.

It is usually preferred to first adjust the acid strength, when necessary, and then add a sufficient amount of inhibiting agent to prevent the action of the acid on the hydrated oxides. The hydrated oxide or oxides are then added and the solution agitated by any suitable means for a sufficient length of time depending upon the amount of removal necessary or desirable. The solution is then allowed to become quiescent to permit the settling of the hydrated oxide containing the adsorbed impurities. The supernatant liquor is then so decanted and filtered as to prevent the passage of any appreciable portion of the colloidal gel through the filter medium.

The gelatinous flocculent insoluble hydroxides of practically all metals may be used, but they have varying affinities for these traces of arsenic, and their adsorptive powers are highly specific, some adsorbing more strongly and more readily than others. As examples, we may use hydroxides of aluminum or iron, and any mixture or mixtures thereof. Preferably the ferric hydroxides are used. While it is ordinarily desirable to use the freshly precipitated hydroxide, we have found that those that have aged when properly prepared may be used nearly as effectively as the freshly prepared hydroxides.

Filtering may be accomplished with any of the standard commercial filters readily available on the market, but we prefer to use a plate and frame filterpress with the addition to the treated solution, although not essential, of moderate quantities of pectinizing agents which favor flocculation of the precipitate, thereby assisting in the more complete removal of the hydrated oxides after they have adsorbed the arsenic. We have used, as such pectinizing agents, several different grades of diatomaceous earth, activated carbon, fuller's earth, clays, silicas, etc.

As inhibiting agents or agents which prevent the dissolution of insoluble metal hydrated oxides in acid or acid solution we have found that tannic acid and the tannates are effective, although many proteins, mercaptans, and other agents have been found to inhibit the activity of the acid upon the metallic hydroxides. The tannic acid and tannates and the naturally-occurring forms of such compounds hereinbefore referred to are herein generically designated as tannin-like bodies.

While we have herein disclosed a few illustrative examples of our invention and modes of practicing it, it is to be understood that the invention comprehends other process steps and treatments without departing from the spirit thereof.

Having thus disclosed the invention, we claim:

1. A process of removing an arsenical impurity from a solution containing the same, comprising acidifying said solution, adding tannic acid, treating said solution with an hydroxide of iron to adsorb said impurity, and separating the solution to free it from arsenical impurity.

2. A process for treating an acid solution containing arsenical impurities and tannic acid to remove such arsenical impurities, comprising contacting said solution with an insoluble gelatinous metal hydrated oxide to adsorb said arsenical impurities and separating the hydrated oxide and adsorbed arsenical impurities from the solution.

3. A process for removing arsenical impurities from a solution containing the same, comprising acidifying said solution, supplying tannic acid in said solution and adding ferric hydroxide thereto to adsorb said arsenical components and removing the hydroxide and adsorbed arsenical components from the solution.

4. A process for treating acid fruit juice products containing tannin-like bodies and arsenical impurities, comprising contacting said solution with ferric hydroxide and aluminum hydroxide to adsorb said arsenical components and separating the hydroxides and adsorbed impurities from the solution.

5. A process for removing arsenical impurities from vinegar containing tannin-like bodies comprising, contacting the vinegar with ferric hydroxide to adsorb said arsenical components and removing the hydroxide and adsorbed arsenical components from the vinegar.

6. A process for removing arsenical impurities from a solution containing the same, comprising acidifying said solution, adding a tannate, treating said solution with an hydroxide of iron to adsorb said impurities, and separating the solution to free it from the arsenical impurities.

7. A process of removing arsenical impurities from a solution containing the same, comprising acidifying said solution, adding a tannate, treating said solution with an insoluble adsorptive metal hydroxide to adsorb said impurities, and separating the solution to free it from arsenical impurities.

8. A process for treating an acid solution containing arsenical impurities and tannin-like bodies to remove such arsenical impurities, comprising contacting said solution with an insoluble gelatinous metal hydroxide to adsorb said arsenical impurities and separating the hydrated oxide and adsorbed arsenical impurities from the solution.

9. A process for removing arsenical impurities from a solution containing the same, comprising acidifying said solution with acetic acid, supplying tannic acid in said solution and adding ferric hydroxide thereto to adsorb said arsenical components and removing the hydroxide and adsorbed arsenical components from the solution.

10. A process for removing arsenical impurities from a solution containing the same, comprising acidifying said solution, supplying tannin-like bodies in said solution and adding ferric hydroxide thereto to adsorb said arsenical components and removing the hydroxide and adsorbed arsenical components from the solution.

11. A process for removing arsenical impurities from a solution containing the same, comprising acidifying said solution with acetic acid, supplying tannin-like bodies in said solution and adding ferric hydroxide thereto to adsorb said arsenical components and removing the hydroxide and adsorbed arsenical components from the solution.

12. A process for removing arsenical impurities from vinegar containing tannin-like bodies comprising contacting the vinegar with an insoluble gelatinous metallic hydroxide to adsorb said arsenical compounds, and removing the hydroxide and adsorbed arsenical compounds from the vinegar.

13. A process for removing arsenical impurities from a solution containing the same comprising acidifying said solution, supplying an inhibitor from the class consisting of tannic acid and tannates in said solution and adding aluminum hydroxide thereto to adsorb said arsenical impurities and removing the hydroxide and adsorbed arsenical impurities from the solution.

14. A process for treating acid fruit juice products containing tannin-like bodies and arsenical impurities comprising contacting said solution with a gelatinous hydroxide selected from the class consisting of aluminum and iron hydroxides to adsorb said arsenical impurities and separating the hydroxides and adsorbed impurities from the solution.

15. A process for removing arsenical impurities from vinegar comprising contacting the vinegar with aluminum hydroxide to adsorb said arsenical impurities and removing the hydroxide and adsorbed arsenical impurities from the vinegar.

VICTOR E. SPEAS.
NATHAN M. MNOOKIN.